July 12, 1966    F. KOHLER    3,260,794
PROTECTIVE COVER FOR CABLE SPLICE
Filed April 23, 1964
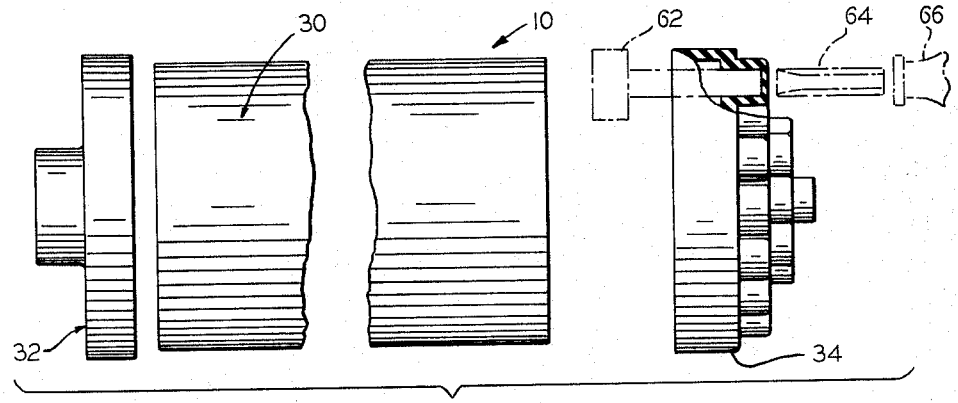
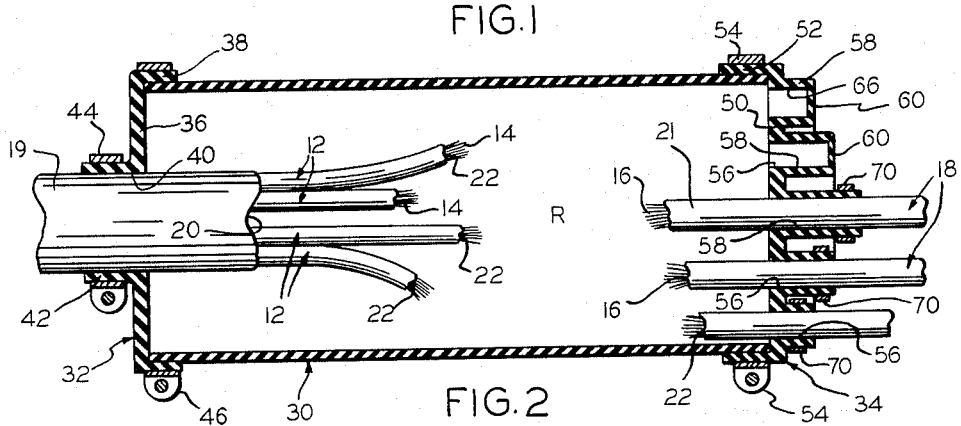
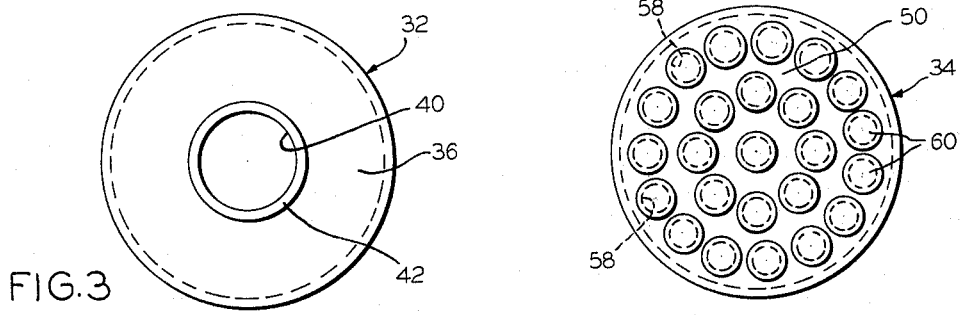
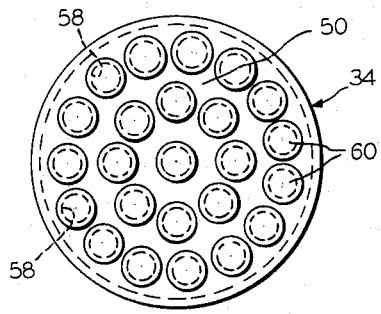
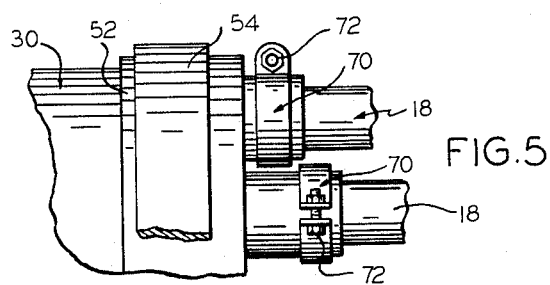
INVENTOR.
FRED KOHLER
BY
ATTORNEY

United States Patent Office 3,260,794
Patented July 12, 1966

3,260,794
PROTECTIVE COVER FOR CABLE SPLICE
Fred Kohler, Chicago, Ill., assignor to Kohler & Besser Electronics, Inc., a corporation of Illinois
Filed Apr. 23, 1964, Ser. No. 362,154
3 Claims. (Cl. 174—138)

This invention relates to a protective sleeve or cover for a splice connecting a number of cables and cable strands.

The improved protective cover comprising the present invention has been designed primarily for use in connection with the gang splicing of telephone cables, for example the multiple feeder cables entering a building and each of which accommodates many trunk lines, or the vault circuit cables existing at the telephone exchange itself or at outlying relay stations. The structure according to the invention is capable of other uses than in the telephone field, and the protective cover of the present invention may be employed in connection with the gang splicing of telegraph cables, or the grouped cables which are associated with the wiring of multi-circuit equipment such as electronic computers, and a wide variety of other industrial electric or electronic equipment too numerous to mention. Irrespective of the particular use to which the structure of the invention may be put, the essential features thereof are at all times preserved.

It is essential that such cable splice covers be impervious to the entrance of dirt and moisture and, as a consequence, it is necessary to seal the various feeder and main frame cable at their regions of entrance and emergence respectively. Since the sheathed cables are often subject to internal pressure to prevent the ingress of moisture to the cable strands, for obvious reasons, it is important that all splices be likewise capable to withstand such pressure for the same reasons.

The structure according to the present invention is designed to accomplish complete sealing of the cable splice against entrant moisture, and to maintain the proper pressure throughout the run of cable, and toward this end it contemplates the provision of a novel three-piece sectional cover assembly including an open-ended tubular cylindrical jacket body, together with end caps therefor, the three parts being formed of a resilient flexible moldable material such as a suitable elastomer having a proper durometer. The end cap accommodating entrance of an encased feeder cable at one end is provided with a single central opening therethrough, while the other end cap which accommodating a plurality of outgoing main frame cables is formed with plural openings, there being one opening for each such individual main frame cable. Preferably, these latter openings are arranged in a plurality of concentric circular rows surrounding a single central opening. Each opening, including the single opening in the entrance end cap, is provided with an outwardly extending flexible sealing flange therearound adapted to be encircled by a conventional split clamping band capable of being constricted about the flange to in turn constrict the flange coextensively about its associated main frame or feeder cable, as the case may be. The flanges which surround the openings in the end cap for the main frame cables are formed in three different lengths to facilitate application thereto of the various split clamping bands, the flanges which surround the outer circular row of openings being relatively short, the flanges which surround the inner circular row being somewhat longer so that they project forwardly beyond the first mentioned flanges, and the flange which surrounds the central opening being longer than any of the other flanges, and projecting forwardly thereof. By such an arrangement of flanges, interference between adjacent clamping bands is avoided and each clamping band is readily available for tightening or loosening as required. The flexible sealing flanges and their associated clamping bands render the use of a sealant material unnecessary. Clamping bands are also employed for tightening the telescopic end caps upon the rim regions of the open-ended cylindrical jacket.

The provision of a composite three-piece protective cover of the character briefly outlined above being among the principal objects of the invention, it is another object to provide such a protective cover wherein the component parts thereof are susceptible of conventional molding operations and require no complicated or intricate molding dies, thus contributing toward economy of manufacture.

A still further object is to provide an end cap having openings for a plurality of main frame cables, such openings being originally closed and sealed by the provision of integral sealing webs which are capable of removal by a punching operation so that only the required number of openings need be prepared for use, the unused openings remaining sealed. Thus, if at a future time additional main frame cables are to be connected into the circuitry, new main frame cables may be brought into the splicing area through the unused openings by the simple expedient of punching out of the sealing webs.

Other objects and advantages of the invention will become readily apparent as the following description ensures.

In the accompanying single sheet of drawings forming a part of this specification, one illustrative embodiment of the invention is shown.

In the drawing:

FIG. 1 is a fragmentary exploded view of a protective cable splice cover constructed according to the present invention;

FIG. 2 is a sectional view taken substantially centrally and longitudinally through the structure of FIG. 1, showing the same operatively associated with a splice made between a sheathed feeder cable comprised of a plurality of cable strand bundles and a plurality of main frame cables;

FIG. 3 is an end view of an entrance end cap for the feeder cable;

FIG. 4 is an opposite end view of the cable splice cover showing the end cap for the main frame cables; and FIG. 5 is an enlarged fragmentary side elevational view of the exit region of the cable splice cover.

Referring now in particular to FIG. 1, the protective cable splice cover embodying the principles of the present invention has been designated in its entirety at 10 and it is employed for the purpose of enclosing the splicing area or region R associated with a series of incoming feeder cables 12 containing multiple leads or circuit wire strands 14 adapted to be spliced to respective leads or circuit wire strands 16 associated with a series of outgoing sheathed cables 18 referred to as main frame cables. If the cable splice cover 10 is employed in connection with telephone circuitry, the incoming feeder cables 12 may be part of a single feeder cable 19 coming into a building, in which case the cables 18 will represent main frame cables, while the leads 14 and 16 of such cables 18 and 19 will represent the various trunk lines extending to the subscribers' telephones.

In the illustrated environment of the present cable splice cover 10, it may be assumed that a full complement of twenty four incoming cable bundles 12 extend into the cover 10 while only three outgoing main frame cables 18 emerge therefrom. The details of the splicing between the strands or leads 14 and 16 have not been illustrated, since such details will vary widely with different installations and splicing techniques.

The splicing region R is of appreciable extent so that ample room is afforded for the staggering of the individual splices.

As best seen in FIGS. 2, 3 and 4, the splice cover 10 of the present invention involves in its general organization three principal parts, namely a medial cylindrical jacket 30 and a pair of end caps 32 and 34 respectively. The end cap 32 accommodates the entry of the feeder cable 19 and its groups of cable strands 12 and thus, for convenience of description herein it will hereinafter be referred to as the lead-in end cap. The opposite end cap 34 accommodates exit of the individual main frame cables 18 and will hereinafter be referred to as the lead-out end cap. The three parts 30, 32 and 34 are preferably formed of a molded elastomer which possesses a considerable degree of resistance to compressional forces, so that the parts are not easily deformed and will retain their shape under all normal conditions encountered in use. Various elastomeric materials are suitable for the manufacture of the parts including rubber, either natural or synthetic, a rubber compound such as vinyl or silicone rubber, or a rubber substitute.

The end cap 32 is in the form of a flange annulus, and it includes a web 36 having a rim flange 38 telescopically received over the entrance end of the cylindrical jacket 30 with a tight frictional fit. Web 36 has a relatively large entrant opening 40 and is coextensive with a cable-retaining flange 42. Said flange 42 is adapted to be constricted about the sheath of cable 9 which encloses the grouped cables 12 by a suitable split clamping band assembly 44 provided for this purpose. A similar split clamping band 46 may be employed to constrict the rim flange 38 about the cylindrical jacket 30.

The end cap 34 is also in the form of a flanged annulus and has a web 50 provided with a rim flange 52 telescopically received over the exit end of the jacket 30 with a tight frictional fit. Flange 52 is constricted about the jacket by means of a split clamping band 54. As best seen in FIG. 4, the web 50 is formed with a plurality of exit openings 56 therethrough, each opening being surrounded by a main frame cable-retaining flange 58. Normally, the outer end of each retaining flange 58 is closed by the provision of an integral disk-like punch-out membrane or web 60 which extends thereacross but which is capable of being removed by means of a manually operable punch assembly including an anvil 62 and a cooperating punch 64 such as has been shown in dotted lines in FIG. 1. When it is desired to remove one of the webs 60 it is merely necessary for the operator to insert the anvil 62 into the bore 66 established by the associated rim flange 58, and apply the circular cutting end of the punch 64 to the outer side of the web 60, after which a blow by a suitable impact tool such as the hammer shown in dotted lines at 68 will effectively sever the membrane from the rim flange.

The various openings 56 are arranged in a pattern consisting of a central opening which is surrounded by concentric inner and outer circular rows of openings. Preferably, the number of openings 56 will correspond to the number of grouped cables 12 entering the splice cover so that when all of such cables are put to use, a corresponding number of outgoing main frame cables 18 may be brought into the splice cover 10 through the openings 56 and the leads 16 thereof spliced to the leads 14 of the cables 12.

It is to be noted at this point that the longitudinal extent of the rim flanges 58 associated with the outer circular row of openings 56 are of comparatively short axial extent, while the rim flanges associated with the inner circular row of openings are somewhat longer. The rim flange 58 for the central opening 56 is of still greater axial extent. The rim flanges of the inner circular row thus projects forwardly beyond the plane of the terminal ends of the rim flanges of the outer row, while the rim flange at the center of the bottom wall 50 projects forwardly beyond the plane of the terminal ends of the rim flanges of the inner row. By such an arrangement there is ample clearance for installation of a split clamping band on each of the rim flanges when such rim flange is put to use, several such clamping bands being shown installed on respective rim flanges in FIGS. 1, 2 and 3 designated at 70.

The specific forms of split clamping bands 44, 46, 54 and 70 shown herein form no part of the present invention. Various clamping bands suitable for the purpose of constricting the rim flanges 38, 52 and 58 about the rim regions of the jacket 30 and about the cables 18 are commercially available. Although the illustrated bands are shown as employing tangential draw bolts 72 (FIG. 3) for band-tightening purposes, obviously clamping bands of the well known worm drive type may be employed if desired.

In the installation of the protective splice cover 10, the encased incoming cables 12 as a group will be inserted through the opening 40 in the end cap 32, and the cable group pulled through the end cap 34 a sufficient distance that the cylindrical jacket 30 may be inserted endwise over these cables and passed therealong until the loose wires 14 are accessible beyond the far end of the jacket 30 for splicing purposes. The requisite number of outgoing main frame cables 18 will be inserted through the openings 56 which previously are prepared for their reception by punching out the membranes 60. Thereafter, the necessary splicing operations are effected and, after all wires are taped or otherwise prepared for storage of the spliced joints within the cover 10, the end cap 32 may be assembled upon the jacket 30 and the assembly of the end cap and jacket slid along the group of incoming cables 12 until the spliced joints are all contained within the cylindrical confines of the jacket. The clamping bands 44 and 46 may then be applied and tightened. The end cap 34 is then slid along the cables 18 toward the splicing region R and applied over the adjacent end of the cylindrical jacket 30, after which the clamping band 54 may be applied. Finally, the various clamping bands 70 are applied to the rim flanges 58 of the openings 56 and tightened.

The invention is not to be limited to the exact arrangement of parts shown in the accompanying drawings or described in this specification as various changes in the details of construction may be resorted to without departing from the spirit of the invention. For example, whereas the end cap 34 has been illustrated and described herein as being formed with twenty-four exit openings 56, including a centrally disposed opening and two concentric circular rows of openings, a greater or lesser number of such openings may be employed if desired. Furthermore, the openings 56 may, if desired, be distributed on the wall of the end cap in any desired pattern of openings and the axial extent of the various rim flanges 58 may be so proportioned as to give ready access thereto for purposes of clamping band installation without interference between adjacent rim flanges. Furthermore, it is not essential that both end caps 32 and 34 be removable for purposes of access to the interior of the protective jacket 30. Under certain circumstances it may be desirable that the end cap 32 be dispensed with and the entrance end of the jacket 30 closed by an integral end wall. Therefore, only insofar as the invention has particularly been pointed out in the accompanying claims is the same to be limited.

I claim:

1. As an article of manufacture, a protective splice cover adapted to enclose a splicing region wherein the lead wires associated with a series of incoming cables are joined to the lead wires associated with a series of outgoing cables, said cover comprising in combination: a tubular jacket having an entrance end through which the incoming cables are adapted to extend and an exit end through which the outgoing cables are adapted to extend, means defining a closure for said entrance end of the jacket and through which the incoming cables are adapted to sealingly extend, and a removable end cap normally closing the exit end of said jacket, said end cap comprising a one-piece integral body of resilient material of generally cup-shape and including a web provided with a continuous peripheral flange telescopically fitting over the rim region of said exit end of the jacket, with said web effectively closing said exit end, said web having a series of circular openings therein for individual reception therethrough of said outgoing cables, each of said opening having a surrounding outwardly extending flange adapted to be constricted about a respective outgoing cable, said outwardly extending flanges being arranged in concentric circular rows, the flanges in a given circular row being of substantially the same axial extent, and the axial extent of the flanges in succeeding circular rows outward from the center of the web having decreasing axial extent.

2. The invention of claim 1 wherein each of said outward extending flanges is provided with an integral membrane thereacross for closing the opening across said flange, said membrane being adapted for removal from the flange by a punching operation.

3. The invention of claim 1 wherein each outward extending flange is provided with a clamping band adapted to be constricted about an outgoing cable passing through said extending flange, and wherein the progressive decreasing magnitude of the axial extent of the flanges enables each of said clamping bands to be readily secured to its cooperating flange.

References Cited by the Examiner

UNITED STATES PATENTS

| 2,862,042 | 11/1958 | Bollmeier | 174—76 X |
| 3,209,069 | 9/1965 | Ruddell et al. | 174—138 |

FOREIGN PATENTS

| 1,053,609 | 3/1959 | Germany. |
| 910,966 | 11/1962 | Great Britain. |
| 173,021 | 10/1960 | Sweden. |

LARAMIE E. ASKIN, *Primary Examiner.*

DARRELL L. CLAY, ROBERT K. SCHAEFER,
*Examiners.*